(12) United States Patent
Yang

(10) Patent No.: US 7,700,236 B2
(45) Date of Patent: *Apr. 20, 2010

(54) CATHODE MATERIAL FOR MANUFACTURING A RECHARGEABLE BATTERY

(75) Inventor: Chih-Wei Yang, Taipei (TW)

(73) Assignee: Aquire Energy Co., Ltd., Taipei (TW)

( * ) Notice: Subject to any disclaimer, the term of this patent is extended or adjusted under 35 U.S.C. 154(b) by 739 days.

This patent is subject to a terminal disclaimer.

(21) Appl. No.: 11/510,096

(22) Filed: Aug. 25, 2006

(65) Prior Publication Data

US 2007/0059598 A1 Mar. 15, 2007

Related U.S. Application Data

(63) Continuation-in-part of application No. 11/222,569, filed on Sep. 9, 2005, now abandoned.

(51) Int. Cl.
*H01M 4/58* (2006.01)
*H01M 4/36* (2006.01)
*C01B 25/45* (2006.01)

(52) U.S. Cl. .......... 429/218.1; 252/182.1; 423/306; 429/220; 429/221; 429/223; 429/224; 429/229; 429/231.5; 429/231.6; 429/231.9; 429/231.95

(58) Field of Classification Search .......... 429/221, 429/223, 224, 220, 229, 231.5, 231.6, 231.9, 429/231.95, 218.1; 252/182.1; 423/306
See application file for complete search history.

(56) References Cited

U.S. PATENT DOCUMENTS

| | | | |
|---|---|---|---|
| 3,304,249 A | 2/1967 | Katz | 204/164 |
| 5,910,382 A | 6/1999 | Goodenough et al. | 429/218.1 |
| 6,528,033 B1 | 3/2003 | Barker et al. | 423/306 |
| 6,632,566 B1 | 10/2003 | Yamada et al. | 429/218.1 |
| 6,716,372 B2 | 4/2004 | Barker et al. | 252/518.1 |
| 6,723,470 B2 | 4/2004 | Barker et al. | 429/231.3 |
| 6,730,281 B2 | 5/2004 | Barker et al. | 423/306 |
| 6,815,122 B2 | 11/2004 | Barker et al. | 429/231.9 |
| 6,884,544 B2 | 4/2005 | Barker et al. | 429/231.1 |
| 6,913,855 B2 | 7/2005 | Stoker et al. | 429/231.95 |
| 6,960,331 B2 | 11/2005 | Barker et al. | 423/306 |
| 7,001,690 B2 | 2/2006 | Barker et al. | 429/221 |
| 7,025,907 B2 | 4/2006 | Kohzaki et al. | 252/518.1 |
| 7,060,206 B2 | 6/2006 | Barker et al. | 252/518.1 |
| 7,060,238 B2 | 6/2006 | Saidi et al. | 423/306 |
| 7,101,521 B2 | 9/2006 | Hosoya et al. | 423/306 |
| 7,390,473 B1 * | 6/2008 | Singhal et al. | 423/306 |
| 2002/0102459 A1 | 8/2002 | Hosoya et al. | |
| 2003/0170542 A1 * | 9/2003 | Barker et al. | 429/231.9 |

(Continued)

FOREIGN PATENT DOCUMENTS

JP 2004079276 3/2004

(Continued)

*Primary Examiner*—Wayne Langel
(74) *Attorney, Agent, or Firm*—Ohlandt, Greeley, Ruggiero & Perle, L.L.P.

(57) ABSTRACT

A cathode material has one of olivine and NASICON structures and includes micrometer-sized secondary particles having a particle size ranging from 1 to 50 μm. Each of the micrometer-sized secondary particles is composed of crystalline nanometer-sized primary particles of a metal compound having a particle size ranging from 10 to 500 nm.

20 Claims, 10 Drawing Sheets

U.S. PATENT DOCUMENTS

| | | |
|---|---|---|
| 2003/0190527 A1 | 10/2003 | Pugh et al. |
| 2004/0005265 A1 | 1/2004 | Chiang et al. |
| 2005/0244321 A1* | 11/2005 | Armand et al. ............. 423/306 |
| 2005/0255026 A1 | 11/2005 | Barker et al. ................ 423/306 |
| 2007/0134554 A1* | 6/2007 | Armand et al. ........ 429/231.95 |
| 2008/0241690 A1* | 10/2008 | Delacourt et al. ........... 429/221 |

FOREIGN PATENT DOCUMENTS

WO     WO02/27824     4/2002

* cited by examiner

CATHODE MATERIAL FOR MANUFACTURING A RECHARGEABLE BATTERY

CROSS-REFERENCE TO RELATED APPLICATION

This application is a continuation-in-part of U.S. patent application Ser. No. 11/222,569, filed on Sep. 9, 2005 now abandoned, and entitled "Method for Making a Lithium Mixed Metal Compound," the entire disclosure of which is incorporated herein by reference.

BACKGROUND OF THE INVENTION

1. Field of the Invention

This invention relates to a cathode material for manufacturing a rechargeable battery, more particularly to a cathode material for manufacturing a rechargeable battery which includes micrometer-sized secondary particles, each of which is composed of crystalline nanometer-sized primary particles. This invention also relates to a cathode for a rechargeable battery including the cathode material.

2. Description of the Related Art

Along with diversified development of electronic products, there is increasing need for portable power supplies. For example, electronic consumer products, medical devices, motorcycles, automobiles, and power tools and the like require a portable power supply for power source. For current portable power supplies, rechargeable batteries are relatively popular. Since lithium rechargeable batteries have a high ratio of volume to capacity, pollution-free and recyclable charge/discharge properties, and no memory effect, it has a great development potential in the future.

Additionally, a cathode material used for manufacture of the cathode plays an important role in the performance of the rechargeable battery. Among the known cathode materials, since lithium ferrous phosphate compounds and the related compounds having similar properties to $LiFePO_4$ compounds, such as $LiMPO_4$, in which M represents transition elements, e.g., manganese (Mn), cobalt (Co), and nickel (Ni), are environmentally benign, relatively stable and abundant, and have relatively good electrochemical properties, e.g., high specific capacity, good charge/discharge cycling performance, and good thermostability, they have been evaluated to be the cathode material with greatest development potential.

However, at present, there is a difference between practical and theoretical electrochemical properties of known $LiFePO_4$ compounds and the related compounds. For example, the theoretical specific capacity of $LiFePO_4$ compounds and the related compounds is about 170 mAh/g, whereas the $LiFePO_4$ compounds disclosed in U.S. Pat. No. 5,910,382 have a specific capacity of about 95 mAh/g, which is far below the theoretical specific capacity. In order to improve the capacity property of the $LiFePO_4$ compounds, it has been proposed to add other elements to the $LiFePO_4$ compounds having one of olivine and NASICON structures so as to increase the capacity property of the $LiFePO_4$ compounds, see U.S. Pat. Nos. 6,716,372 and 6,815,122. However, since the elements used for substituting iron are not easily available, production cost is relatively high.

In addition, U.S. Pat. No. 6,632,566 (hereinafter referred to as the '566 patent) discloses increase in the specific surface of the $LiFePO_4$ compound powders in favor of diffusion of lithium ions in the powders, thereby enhancing capacity of a cathode material made from the $LiFePO_4$ compound powders. Particularly, the cathode material described in the '566 patent is produced by sintering the $LiFePO_4$ compound powders at a suitable temperature in such a manner that the cathode material thus formed is composed of separate single-phase crystalline particles having a grain size not larger than 10 μm. Although the capacity of the cathode material illustrated in the Examples of the '566 patent can be about 163 mAh/g, the $LiFePO_4$ compound powders included in the cathode material have a relatively large particle size and uneven distribution. Thus, the cathode material of the '566 patent cannot be used with aqueous binders and aqueous solvents when applied to manufacture of the cathode. Besides, since the charge/discharge rate of the battery with the cathode material of the '566 patent is about C/37, which is calculated based on data shown in the Examples of the '566 patent, such charge/discharge rate is too low for practical application and needs to be improved.

The parent U.S. patent application Ser. No. 11/222,569 (hereinafter referred to as the '569 application) discloses a method for making a lithium mixed metal compound, such as the lithium ferrous phosphate compounds having an olivine structure. The method disclosed in the '569 application includes preparing a reactant mixture that comprises ion sources of the lithium ferrous phosphate compounds, and exposing the reactant mixture to a non-oxidizing atmosphere in the presence of suspended carbon particles. The lithium ferrous phosphate compounds thus made are in powder form and have relatively small particle size and even distribution.

SUMMARY OF THE INVENTION

The present invention was developed on the basis of the co-pending '569 application. The inventor of the present invention conceives a cathode material that has one of olivine and NASICON structures and that includes micrometer-sized secondary particles, each of which is composed of crystalline nanometer-sized primary particles of a metal compound. The inventor of the present invention found that the cathode material including micrometer-sized secondary particles, each of which is composed of crystalline nanometer-sized primary particles of a metal compound, may be produced by modifying the method called for in the '569 application.

Therefore, according to one aspect of this invention, a cathode material having one of olivine and NASICON structures, includes micrometer-sized secondary particles having a particle size ranging from 1 to 50 μm. Each of the micrometer-sized secondary particles is composed of crystalline nanometer-sized primary particles of a metal compound having a particle size ranging from 10 to 500 nm.

According to another aspect of this invention, a cathode for a rechargeable battery includes an electrode plate and a coating of a cathode material coated on the electrode plate. The cathode material includes micrometer-sized secondary particles having a particle size ranging from 1 to 50 μm. Each of the micrometer-sized secondary particles is composed of crystalline nanometer-sized primary particles of a metal compound having a particle size ranging from 10 to 500 nm.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
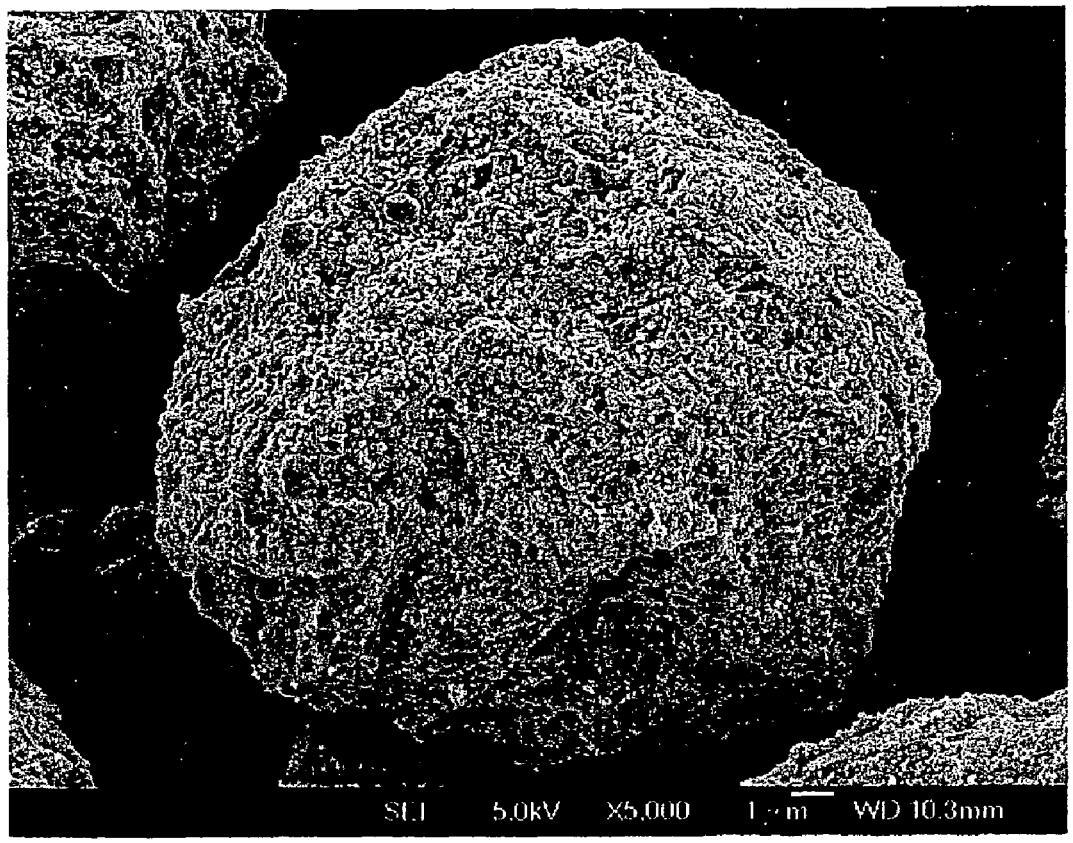
FIG. 1 shows a SEM photograph to illustrate surface morphology of micrometer-sized secondary particles included in the cathode material prepared according to Example D of the present invention.

The preferred embodiment of a cathode material according to this invention has one of olivine and NASICON structures, and includes micrometer-sized secondary particles having a particle size ranging from 1 to 50 μm. Each of the micrometer-sized secondary particles is composed of crystalline nanometer-sized primary particles of a metal compound having a particle size ranging from 10 to 500 nm. Preferably, each of the micrometer-sized secondary particles is formed by sintering of contacted portions of surfaces of adjacent ones of the crystalline nanometer-sized primary particles. More preferably, the cathode material of this invention further includes a carbonaceous component. Most preferably, the cathode material of this invention further includes carbon particles adhered to the surfaces of the crystalline nanometer-sized primary particles of each of the micrometer-sized secondary particles. In addition, the cathode material of this invention is preferred to have a BET specific surface area ranging from 5 to 100 $m^2/g$.

Preferably, the metal compound has a formula of $A_{3x}M_{2y}(PO_4)_3$, in which A represents a first metal element selected from the group consisting of Groups IA, IIA and IIIA; M represents a second metal element selected from the group consisting of Groups IIA and IIIA, and transition elements; and $0 < x \leq 1.2$, $0 < y \leq 1.6$.

More preferably, the first metal element is selected from the group consisting of Li, Na, K, Be, Mg, B, and Al, and the second metal element is selected from the group consisting of Sc, Ti, V, Cr, Mn, Fe, Co, Ni, Cu, Zn, Y, Zr, Nb, Mo, Be, Mg, Ca, Sr, B, Al, Ge, Sn and Ga.

The abovementioned cathode material according to this invention may be manufactured by a method involving formation of particulate precursors of the metal compound followed by crystallization of the metal compound of the particulate precursors to form the crystalline nanometer-sized primary particles and sintering of the crystalline nanometer-sized primary particles.

Particularly, the method includes: preparing a reactant solution including the metal compound, the metal compound having a formula of $A_{3x}M_{2y}(Po_4)_3$, in which A represents a first metal element selected from the group consisting of Groups IA, IIA and IIIA; M represents a second metal element selected from the group consisting of Groups IIA and IIIA, and transition elements, and $0 < x \leq 1.2$, $0 < y \leq 1.6$; drying the reactant solution to form particulate precursors of the metal compound; and heating the particulate precursors under a non-oxidizing atmosphere in the presence of suspended carbon particles so as to crystallize the metal compound of each of the particulate precursors to form the crystalline nanometer-sized primary particles and so as to cause sintering of contacted portions of surfaces of adjacent ones of the crystalline nanometer-sized primary particles to form each of the micrometer-sized secondary particles.

Drying operation of the reactant solution may be conducted through dehydration, ultrasonic spray-drying, spray-drying, freeze-drying, vacuum-drying, filtering, or spray pyrolysis techniques.

Heating operation of the particulate precursors is preferably conducted at a temperature ranging from 400 to 900° C. for 6 to 48 hours.

Alternatively, the abovementioned cathode material according to this invention may be manufactured by a method involving heating of particulate precursors to form the crystalline nanometer-sized primary particles, subsequently granulating the crystalline nanometer-sized primary particles to form the micrometer-sized secondary particles, and followed by sintering of the crystalline nanometer-sized primary particles of each of the micrometer-sized secondary particles.

Particularly, the alternative method includes: preparing a reactant solution including the metal compound, the metal compound having a formula of $A_{3x}M_{2y}(PO_4)_3$, in which A represents a first metal element selected from the group consisting of Groups IA, IIA and IIIA; M represents a second metal element selected from the group consisting of Groups IIA and IIIA, and transition elements; and $0 < x \leq 1.2$, $0 < y \leq 1.6$; drying the reactant solution to form particulate precursors of the metal compound; heating the particulate precursors in the presence of suspended carbon particles so as to crystallize the metal compound of each of the particulate precursors to form the crystalline nanometer-sized primary particles; granulating the crystalline nanometer-sized primary particles into micrometer-sized secondary particles; and heating the granulated micrometer-sized secondary particles under a non-oxidizing atmosphere in the presence of suspended carbon particles so as to cause sintering of contacted portions of surfaces of adjacent ones of the crystalline nanometer-sized primary particles of each of the micrometer-sized secondary particles.

Preferably, the heating operation of the particulate precursors is conducted at a temperature ranging from 550° C. to 600° C. for 2 to 24 hours. Preferably, heating operation of the granulated micrometer-sized secondary particles is conducted at a temperature ranging from 400 to 900° C. for 6 to 48 hours.

In addition, during manufacture of the preferred embodiment of the cathode material of this invention according to the abovementioned methods, a carbonaceous component is optionally added into the reactant solution prior to the drying operation of the reactant solution. The carbonaceous component is one of an organic acid selected from the group consisting of citric acid, oxalic acid, tartaric acid, lactic acid, terephthalic acid, ethylenediaminetetraacetic acid, and acetic acid; a carbohydrate selected from the group consisting of sucrose, lactose, glucose, and oligose; and carbon powders made from a material selected from the group consisting of acetylene carbon black, carbon black, mesophase carbon micro beads (MCMB), supper P and graphite.

Figure 10:
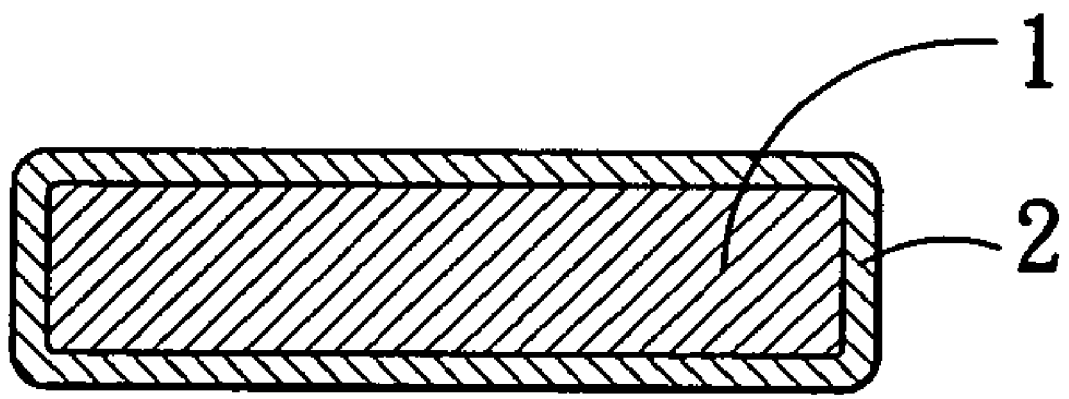
FIG. 10 is a schematic sectional view to illustrate structure of a cathode for a rechargeable battery according to this invention.

Referring to FIG. 10, the preferred embodiment of a cathode for a rechargeable battery according to this invention includes an electrode plate 1, and a coating 2 of the above-mentioned cathode material of this invention coated on the electrode plate 1.

Preferably, the cathode material further includes an aqueous binder, in addition to an aqueous solvent. More preferably, the aqueous binder is styrene-butadiene rubber (SBR). More preferably, the aqueous solvent is deionized water.

Alternatively, the cathode material may further include a non-aqueous binder. Preferably, the non-aqueous binder is polyvinylidene fluoride (PVDF). Preferably, the non-aqueous solvent is N-methyl-pyrrolidone (NMP).

Preferably, the cathode material may further include a thickener. More preferably, the thickener is carboxymethyl cellulose (CMC).

In addition, the preferred embodiment of the cathode thus made may be combined with an anode and an electrolyte to form the rechargeable battery.

EXAMPLE

Analytical Equipment

1. Scanning Electron Microscope (SEM): Hitachi model S-3500V.
2. Particle size distribution analyzer: Horiba, LA-910.
3. Charge/discharge cycle tester: Maccor Series 4000 and 3200 Automated Test Systems (Maccor Inc., Tulsa, Okla., U.S.A)
4. Accelerated surface and porosimetry system: ASAP 2010 (Micromeritics, U.S.A.)

Example A 0.2 mole of ferric nitrate ($Fe(NO_3)_3$) was added into 200 ml of deionized water. After $Fe(NO_3)_3$ was completely dissolved in the deionized water, 0.2 moles of phosphoric acid and 100 ml of 2N lithium hydroxide (LiOH) solution were added in sequence, so as to form a mixture having a stoichiometric ratio 1:1:1 of $Fe^{3+}$:$Li^+$:$PO_4^{3+}$. 100 ml of 0.252 g oxalic acid solution was added to the mixture having $Fe^{3+}$, $Li^+$, and $PO_4^{3+}$ ions. The reactant solution thus formed was dried to form particulate precursors of $LiFePO_4$-based metal compound.

Next, the particulate precursors were placed in an aluminum oxide crucible. The crucible together with charcoal was placed in a tubular furnace which was heated at 700° C. for 12 hours in the presence of an argon carrier gas flowing into the furnace. Carbon particles formed from the charcoal were suspended in the argon carrier gas and were mixed with the micro-particulate precursors, thereby crystallizing the metal compound of each of the particulate precursors to form the crystalline nanometer-sized primary particles and causing sintering of contacted portions of surfaces of adjacent ones of the crystalline nanometer-sized primary particles to form each of the micrometer-sized secondary particles. A powdered cathode material having one of olivine and NASICON structures and including micrometer-sized secondary particles having a particle size ranging from 1 to 50 μm was obtained. Particularly, each of the micrometer-sized secondary particles is composed of crystalline nanometer-sized primary particles of the $LiFePO_4$-based metal compound that have a particle size ranging from 10 to 500 nm and that have carbon particles adhered to surfaces thereof, and is formed by sintering of contacted portions of the surfaces of adjacent ones of the crystalline nanometer-sized primary particles.

Example B

In this example, the powdered cathode material includes micrometer-sized secondary particles, each of which is composed of nanometer-sized primary particles, was prepared in a manner similar to that of Example A, except that 0.2 mole of $Fe(NO_3)_3$ was replaced with 0.2 mole of ferric chloride ($FeCl_3$).

Example C

In this example, the powdered cathode material includes micrometer-sized secondary particles, each of which is composed of nanometer-sized primary particles adhered with carbon particles, was prepared in a manner similar to that of Example A, except that 0.2 mole of $Fe(NO_3)_3$ was replaced with 0.2 mole of iron (Fe) powders.

Example D

In this example, the powdered cathode material includes micrometer-sized secondary particles, each of which is composed of nanometer-sized primary particles adhered with carbon particles, was prepared in a manner similar to that of Example C, except that 100 ml of 0.252 g oxalic acid solution was replaced with 100 ml of 0.42 g citric acid solution.

Example E

In this example, the powdered cathode material includes micrometer-sized secondary particles, each of which is composed of nanometer-sized primary particles adhered with carbon particles, was prepared in a manner similar to that of Example D, except that 0.1 g of glucose was added to the reactant solution after the addition of the citric acid solution.

Example F

In this example, the powdered cathode material includes micrometer-sized secondary particles, each of which is composed of nanometer-sized primary particles adhered with carbon particles, was prepared in a manner similar to that of Example D, except that 0.1 g of sucrose was added to the reactant solution after the addition of the citric acid solution.

Example G

In this example, the powdered cathode material includes micrometer-sized secondary particles, each of which is composed of nanometer-sized primary particles adhered with carbon particles, was prepared in a manner similar to that of Example D, except that 0.2 mole of the iron powders were replaced with a mixture of 0.196 mole of iron powders, 0.002 mole of magnesium chloride ($MgCl_2$), and 0.002 mole of aluminum chloride ($AlCl_3$). The powdered cathode material includes micrometer-sized secondary particles, each of which is composed of nanometer-sized primary particles of $LiFe_{0.98}Mg_{0.01}Al_{0.01}PO_4$ adhered with carbon particles.

Example H

In this example, the powdered cathode material includes micrometer-sized secondary particles, each of which is composed of nanometer-sized primary particles adhered with carbon particles, was prepared in a manner similar to that of Example D, except that the reactant solution was dried to from particulate precursors. The particulate precursors were placed in the aluminum oxide crucible, and the crucible was then placed in the tubular furnace for conducting crystallization of the $LiFePO_4$-based metal compound of the particulate precursors to form crystalline nanometer-sized primary particles. The tubular furnace was heated to 600° C. at a rate of 5° C./min and was maintained at this temperature for 4 hours. The tubular furnace was then cooled to room temperature. The crystalline nanometer-sized primary particles were mixed with and dispersed in 2 wt % of polyvinylene alcohol solution (in a solid-to-liquid ratio of 40:60) in a ball mill for three hours of granulation process to form a slurry. The slurry was spray-dried to form micrometer-sized secondary particles. The micrometer-sized secondary particles were then placed in the aluminum oxide crucible in which charcoal was placed. The crucible was heated at 800° C. for 8 hours in the presence of a nitrogen carrier gas flowing into the furnace. Carbon particles formed from the charcoal were suspended in the nitrogen carrier gas and were mixed with the micrometer-sized secondary particles so as to cause sintering of contacted portions of surfaces of adjacent ones of the crystalline nanometer-sized primary particles of each of the micrometer-sized secondary particles. The furnace was then cooled to room temperature. A powdered cathode material having one of olivine and NASICON structures and including micrometer-sized secondary particles having a particle size ranging from 1 to 50 µm was obtained. Particularly, each of the micrometer-sized secondary particles is composed of crystalline nanometer-sized primary particles of the $LiFePO_4$-based metal compound that have a particle size ranging from 10 to 500 nm and that have carbon particles adhered to surfaces thereof, and is formed by sintering of contacted portions of the surfaces of adjacent ones of the crystalline nanometer-sized primary particles.

Results of Evaluation Tests

Diameter Analysis

Figure 2:
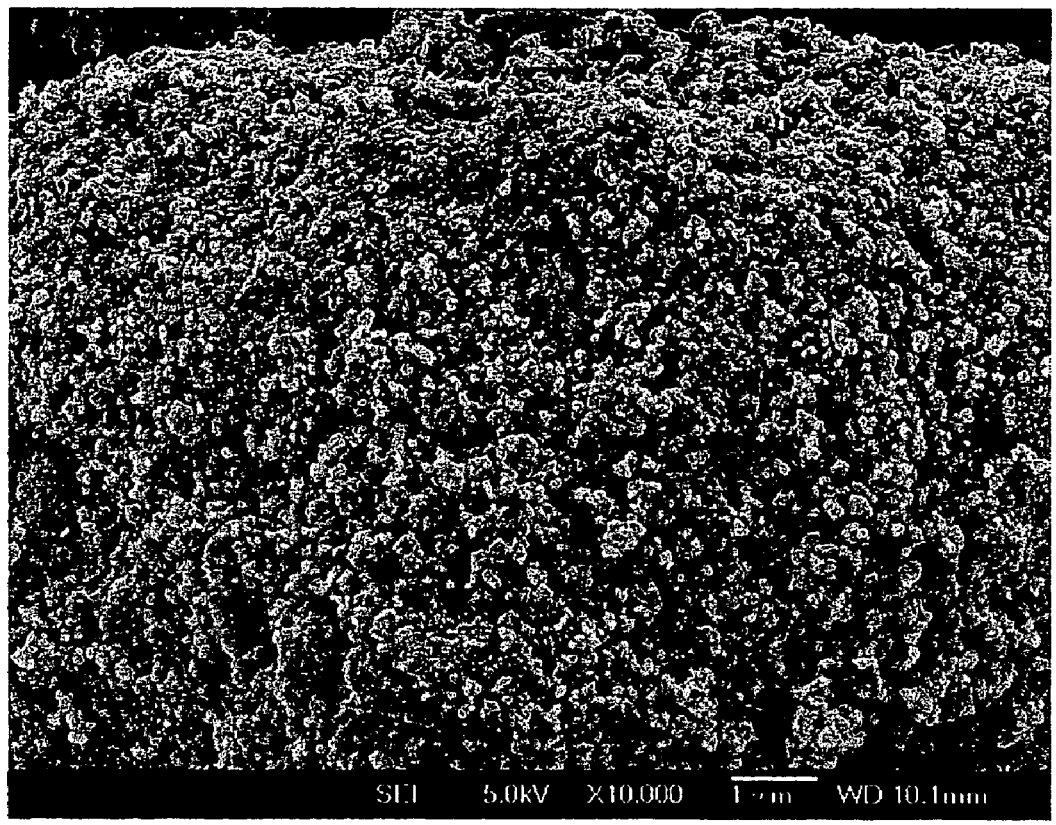
FIG. 2 shows a SEM photograph to illustrate surface morphology of nanometer-sized primary particles which compose each of the micrometer-sized secondary particles included in the cathode material prepared according to Example D of the present invention.

FIGS. 1 and 2 show SEM photographs of the powdered cathode material obtained from Example D under observation using a scanning electron microscope at magnification ratios of 5000 times and 10000 times, respectively. From the results shown in FIGS. 1 and 2, the powdered cathode material obtained from Example D includes the micrometer-sized secondary particles having a particle size larger than 10 µm, each of which is composed of the crystalline nanometer-sized primary particles having a particle size ranging from 50 to 100 nm.

Figure 3:
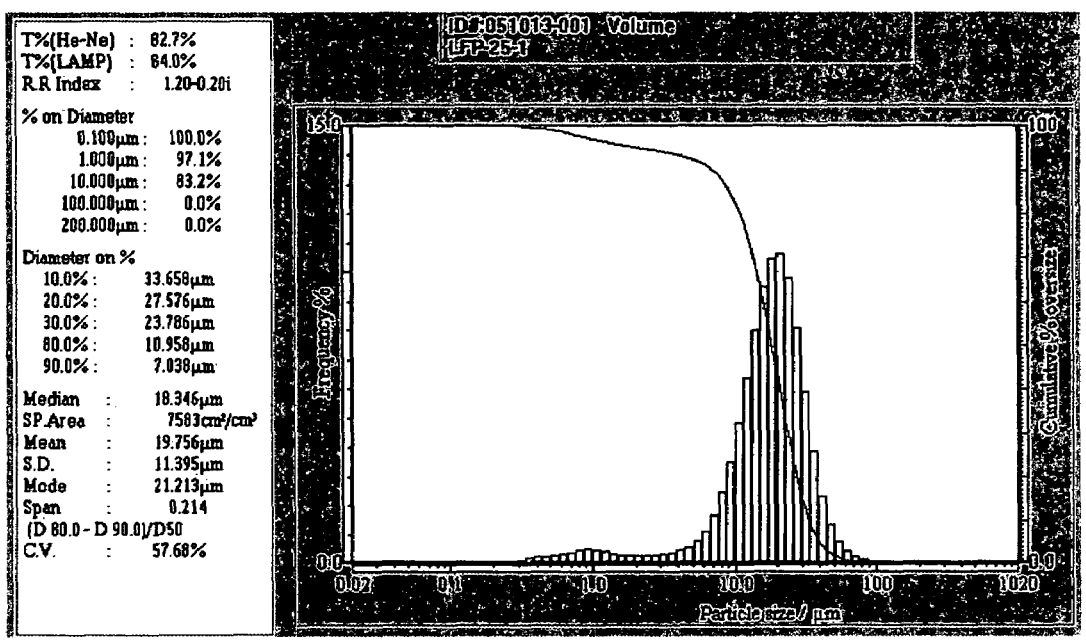
FIG. 3 shows a particle-size analytical plot to illustrate particle-size distribution of the cathode material prepared according to Example D of the present invention.

Subsequently, 10 g of the powdered cathode material obtained from Example D was placed in the particle size distribution analyzer to evaluate particle size distribution of the micrometer-sized secondary particles. From results shown in FIG. 3, 10%, 20%, 30%, 50%, 80%, and 90% of cumulative volumetric diameters of the powdered cathode material of Example D are respectively at about 33.7 µm, 27.6 µm, 23.8 µm, 18.3 µm, 11 µm and 7.0 µm. From the value of 50% of cumulative volumetric diameter, it is inferred that the particles included in the cathode material are micro-scale. In addition, since only one peak is shown in the plot of FIG. 3, this indicates that particle size distribution of the micrometer-sized secondary particles of Example D is uniform.

Figure 4:
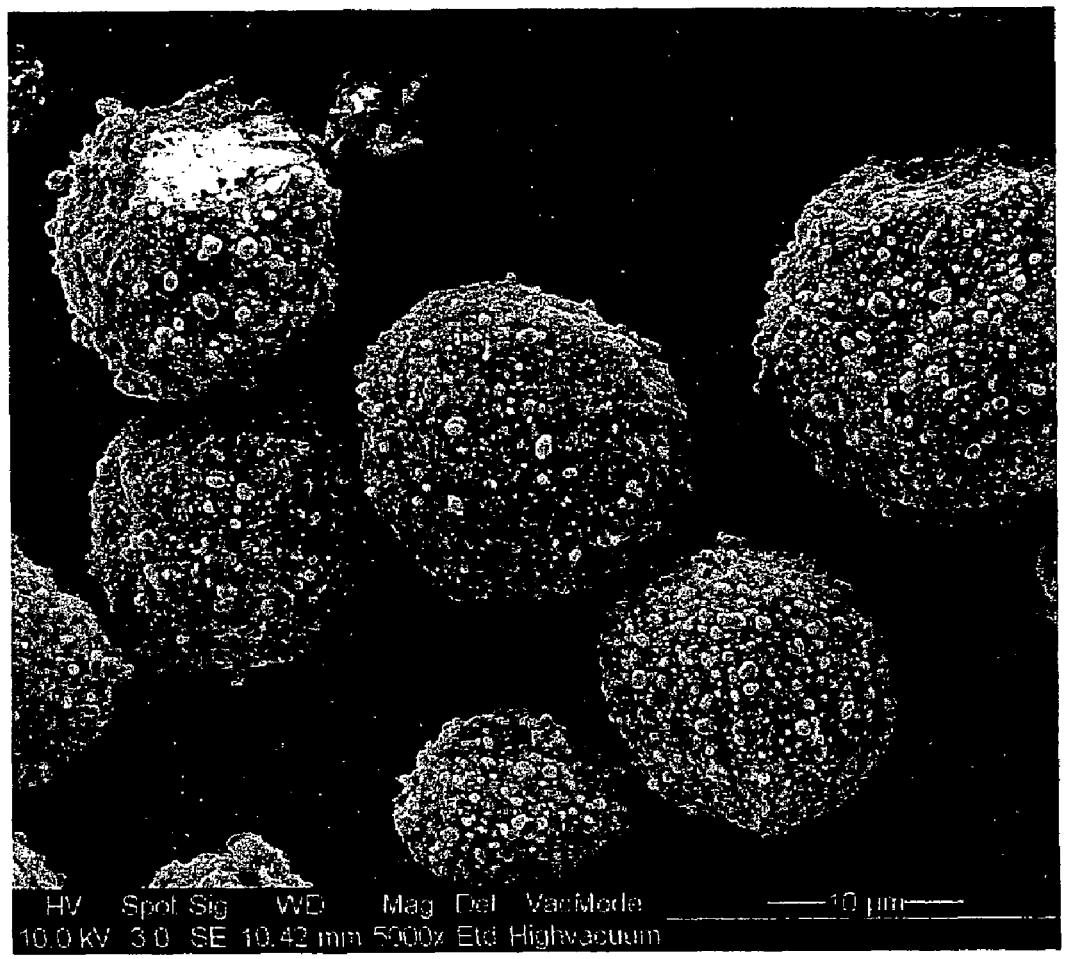
FIG. 4 shows a SEM photograph to illustrate surface morphology of micrometer-sized secondary particles included in the cathode material prepared according to Example H of the present invention.

FIG. 4 shows a SEM photograph of the powdered cathode material obtained from Example H under observation using a scanning electron microscope at a magnification ratio of 5000 times. From the result shown in FIG. 4, which is similar to that of FIG. 1, the powdered cathode material obtained from Example H includes the micrometer-sized secondary particles having a particle size larger than 10 µm, each of which is composed of the crystalline nanometer-sized primary particles having a particle size ranging from 50 to 100 nm.

Specific Surface Area Analysis

The BET (Brunauer-Emmett-Teller) specific surface area of the powdered cathode material of Example E at 77K was calculated from nitrogen isothermal absorption/desorption curve, and has a value of 38.42 $m^2$/g. Similarly, the value of the BET specific surface area of the powdered cathode material of Example H is about 39 $m^2$/g. The conventional cathode material described in the '566 patent in the background part has a BET specific surface area of about 2.5 $m^2$/g. Apparently, the cathode material of this invention has a much higher BET specific surface area.

Charge/Discharge Test

Figure 6:
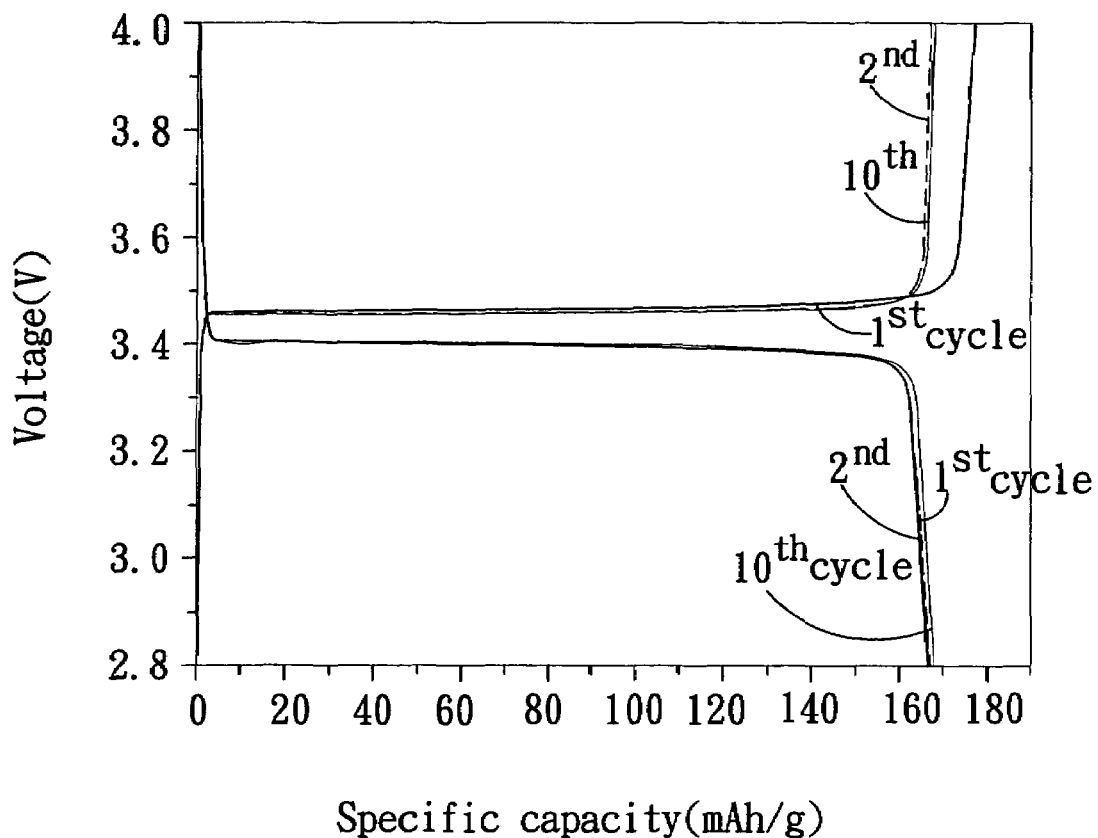
FIG. 6 is a voltage versus specific capacity plot for a cathode coated with a coating of a cathode material obtained from Example G of this invention.
Figure 7:
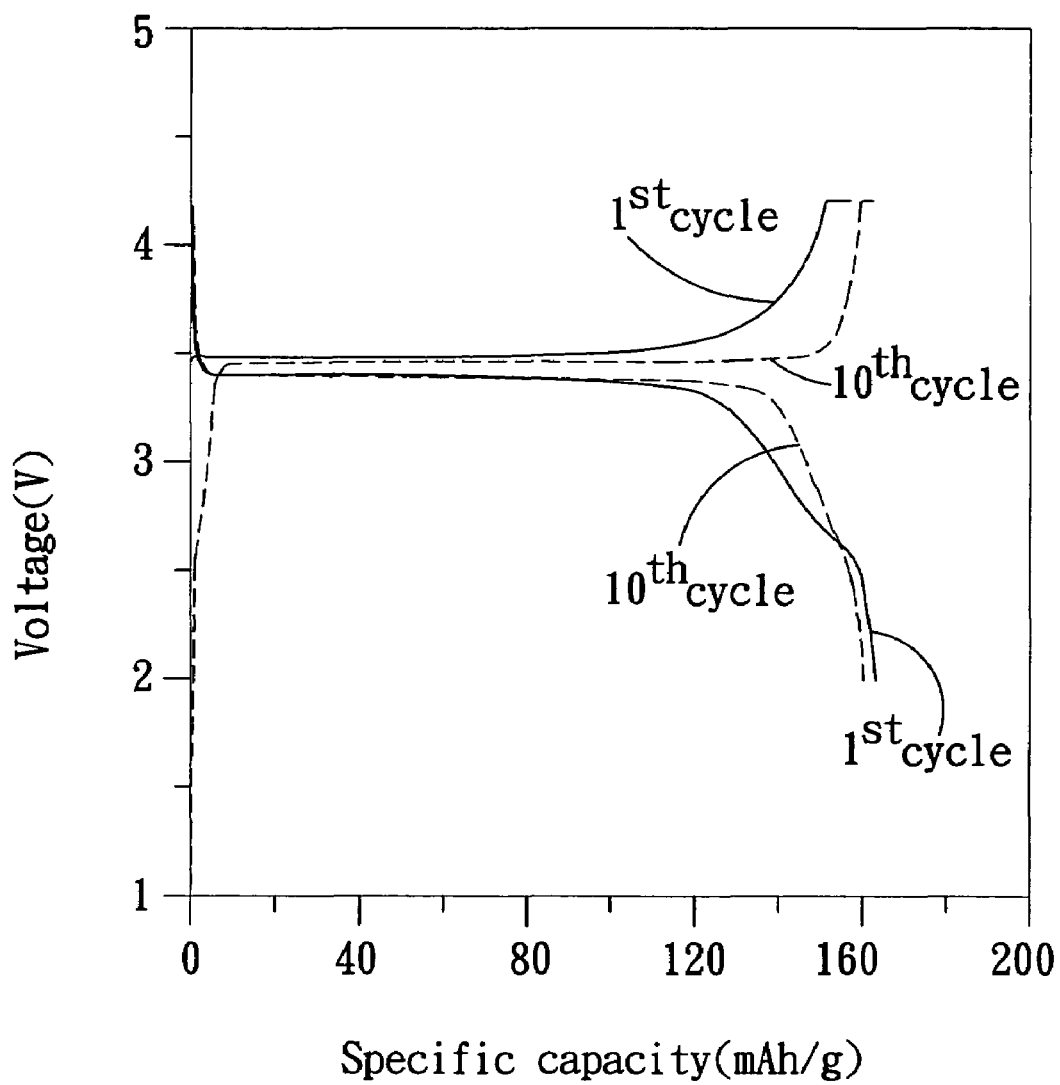
FIG. 7 is a voltage versus specific capacity plot for a cathode coated with a coating of a cathode material obtained from Example H of this invention.

The powdered cathode material obtained from respective Examples F, G and H was evenly mixed with carbon black and polyvinylidene fluoride in a weight ratio of 83:10:7 to form a slurry mixture. The slurry mixture was then coated on an aluminum foil and was dried to produce a cathode specimen. The cathode specimen was combined with lithium metal to form a 2032 type button rechargeable battery. Charge/discharge tests were performed on the button rechargeable battery thus formed with a Maccor Series 4000 Automated Test System (Maccor Inc., Tulsa, Okla., U.S.A.). The applied charge/discharge voltage ranged from 2.8 V to 4.0 V, and the charge/discharge rate was set to 0.2C. Results of the charge/discharge test are shown in FIGS. 5, 6 and 7.

Figure 5:
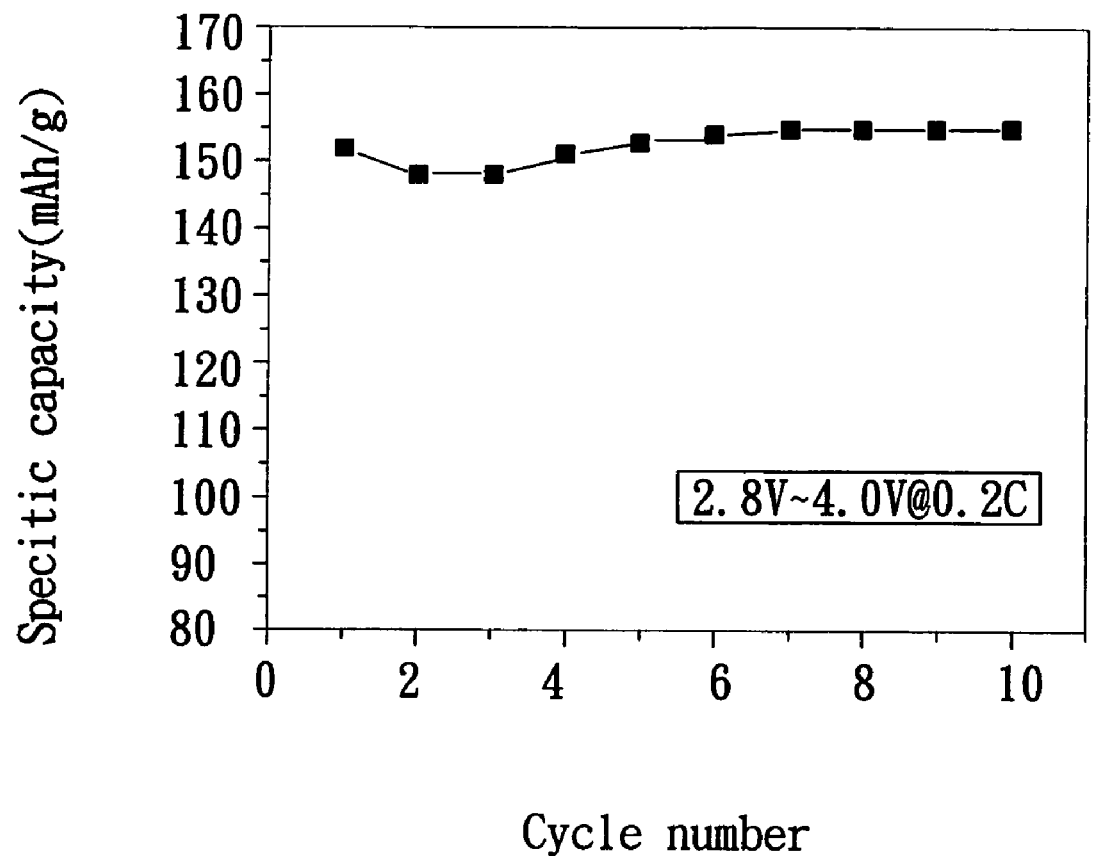
FIG. 5 shows a specific capacity versus cycle number plot of a cathode coated with a coating of a cathode material obtained from Example F of the present invention.

From the result shown in FIG. 5, the initial specific capacity of the cathode made from the powdered cathode material of Example F can reach 152 mAh/g, and such specific capacity can be maintained at 100% after ten charge/discharge cycles. From the result shown in FIG. 6, the initial specific capacity of the charge curve of the cathode made from the powdered cathode material of Example G can reach 167 mAh/g, which approximates the theoretical specific capacity of lithium ferrous phosphate compounds, i.e., 170 mAh/g. In addition, from the result shown in FIG. 7, the specific capacity of the charge curve of the cathode made from the powdered cathode material of Example H can reach 162 mAh/g.

Charge/Discharge Test of a Whole Battery

The powdered cathode material obtained from Example F was mixed with different solvents and binders and then coated on electrode plates to form batteries. Each of the batteries was tested at different charge/discharge rates to evaluate the electrical property.

Battery 1

Figure 8:
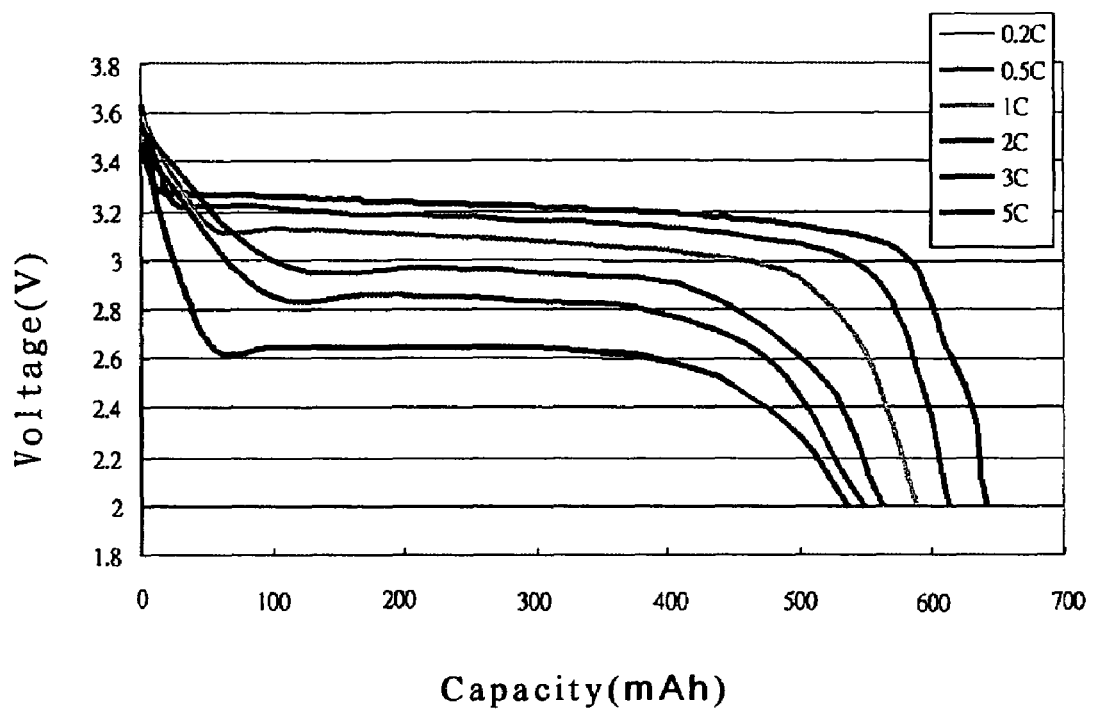
FIG. 8 is a voltage versus capacity plot for a cathode rechargeable battery with a cathode coated with a coating of a cathode material obtained from Example F of this invention at different charge/discharge rates.

The powdered cathode material obtained from Example F was mixed with polyvinylidene fluoride and carbon powders in a weight ratio of 85:12:3 in N-methyl-pyrrolidone (NMP) solvent to form a mixture having a viscosity of 4000 mPa·s. Then, the mixture was coated on an aluminum electrode plate and dried at 100° C. The dried aluminum electrode plate has a thickness of 132 µm, and the powdered cathode material coated on the aluminum electrode plate was not peeled therefrom. The electrode plate was then cut and assembled with a carbon anode and an electrolyte solution containing 1 mol/l of $LiPF_6$ in 5 g of ethylene carbonate/diethyl carbonate (EC/DEC) to form a prismatic battery. Charge/discharge tests were performed on the prismatic battery at various charge/ discharge rates, i.e., 0.2C, 0.5C, 1C, 2C, 3C and 5C, using a Maccor Series 4000 Automated Test System (Maccor Inc., Tulsa, Okla., U.S.A.). In FIG. 8, curves 1, 2, 3, 4,5 and 6 respectively correspond to voltage to capacity relationship of the battery 1 at charge/discharge rates of 0.2C, 0.5C, 1C, 2C, 3C and 5C. From the results shown in FIG. 8, it is noted that the battery 1 can be efficiently charged and discharged at different charge/discharge rates. Particularly, the capacity of discharge at a charge/discharge rate of 5C is approximately 87% of that of discharge at a charge/discharge rate of 0.2C. The results shown in FIG. 8 demonstrate that the powdered cathode material of this invention can be easily coated on and adhered to the electrode plate so as to achieve high charge/discharge rates.

Battery 2

Figure 9:
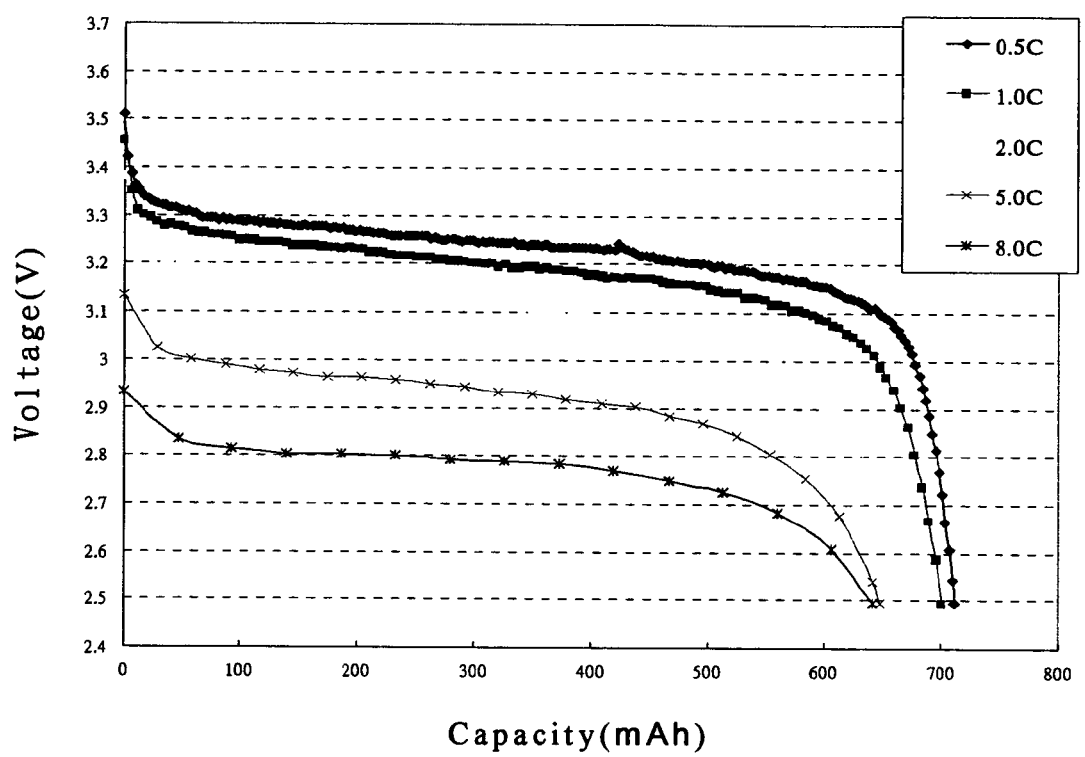
FIG. 9 is a voltage versus capacity plot for cathode rechargeable batteries, each of which has a cathode coated with a coating of a mixture of a cathode material obtained from Example F of this invention and one of various binders.

The powdered cathode material obtained from Example F was mixed with styrene-butadiene rubber (SBR), carboxymethyl cellulose (CMC), and carbon powders in a weight ratio of 95:1.5:0.5:3 in deionized water to form a mixture having a viscosity of 4000 mPa·s. Then, the mixture was coated on an aluminum electrode plate and dried at 80° C. The dried aluminum electrode plate has a thickness of 200 μm, and the powdered cathode material coated on the aluminum electrode plate was not peeled therefrom. The electrode plate was then cut and assembled with a carbon anode and an electrolyte solution containing 1 mol/l of $LiPF_6$ in 5 g of ethylene carbonate/diethyl carbonate (EC/DEC) to form a 18650 battery. Charge/discharge tests were performed on the 18650 battery at various charge/discharge rates, i.e., 0.5C, 1C, 2C, 5C and 8C, using a Maccor Series 3200 Automated Test System (Maccor Inc., Tulsa, Okla., U.S.A.). In FIG. 9, curves 1, 2, 3, 4, and 5 respectively correspond to voltage to capacity relationship of the battery 2 at charge/discharge rates of 0.5C, 1C, 2C, 5C, and 8C. From the results shown in FIG. 9, it is noted that the battery 2 can be efficiently charged and discharged at different charge/discharge rates. Particularly, the capacity of discharge at a charge/discharge rate of 8C is approximately 90% of that of discharge at a charge/discharge rate of 0.5C.

In view of the foregoing, compared with the conventional cathode material, the cathode material of this invention, which includes micrometer-sized secondary particles having a particle size ranging from 1 to 50 μm, each of which is composed of crystalline nanometer-sized primary particles of a metal compound, has an improved specific surface area and capacity.

In addition, the cathode material of this invention is compatible with various binders, particularly aqueous binders, and aqueous solvents, particularly deionized water, and can be easily coated on and firmly adhered to the electrode plate.

While the present invention has been described in connection with what is considered the most practical and preferred embodiments, it is understood that this invention is not limited to the disclosed embodiments but is intended to cover various arrangements included within the spirit and scope of the broadest interpretation and equivalent arrangements.

What is claimed is:

1. A cathode material having a structure selected from the group consisting of olivine and NASICON structures, comprising micrometer-sized secondary particles having a particle size ranging from 1 to 50 μm, each of said micrometer-sized secondary particles being composed of crystalline nanometer-sized primary particles of a metal compound having a particle size ranging from 10 to 500 nm.

2. The cathode material of claim 1, wherein each of said micrometer-sized secondary particles is formed by sintering of contacted portions of surfaces of adjacent ones of said crystalline nanometer-sized primary particles.

3. The cathode material of claim 2, further comprising a carbonaceous component.

4. The cathode material of claim 2, further comprising carbon particles adhered to the surfaces of said crystalline nanometer-sized primary particles of each of said micrometer-sized secondary particles.

5. The cathode material of claim 1, wherein said metal compound has a formula of $A_{3x}M_{2y}(PO_4)_3$, in which A represents a first metal element selected from the group consisting of Groups IA, IIA and IIIA; M represents a second metal element selected from the group consisting of Groups IIA and IIIA, and transition elements; and $0 < x \leq 1.2$, $0 < y \leq 1.6$.

6. The cathode material of claim 5, wherein the first metal element is selected from the group consisting of Li, Na, K, Be, Mg, B, and Al, and the second metal element is selected from the group consisting of Sc, Ti, V, Cr, Mn, Fe, Co, Ni, Cu, Zn, Y, Zr, Nb, Mo, Be, Mg, Ca, Sr, B, Al, Ge, Sn and Ga.

7. The cathode material of claim 1, wherein said cathode material has a BET specific surface area ranging from 5 to 100 $m^2/g$.

8. A cathode for a rechargeable battery, comprising an electrode plate and a coating of a cathode material coated on said electrode plate, wherein said cathode material comprises micrometer-sized secondary particles having a particle size ranging from 1 to 50 μm, each of said micrometer-sized secondary particles being composed of crystalline nanometer-sized primary particles of a metal compound having a particle size ranging from 10 to 500 nm.

9. The cathode of claim 8, wherein each of said micrometer-sized secondary particles is formed by sintering of contacted portions of surfaces of adjacent ones of said crystalline nanometer-sized primary particles of said metal compound.

10. The cathode of claim 9, wherein said cathode material further comprises a carbonaceous component.

11. The cathode of claim 9, wherein said cathode material further comprises carbon particles adhered to the surfaces of said crystalline nanometer-sized primary particles of each of said micrometer-sized secondary particles.

12. The cathode of claim 8, wherein the metal compound has a formula of $A_{3x}M_{2y}(PO_4)_3$, in which A represents a first metal element selected from the group consisting of Groups IA, IIA and IIIA; M represents a second metal element selected from the group consisting of Groups IA and IIIA, and transition elements; and $0 < x \leq 1.2$, $0 < y \leq 1.6$.

13. The cathode of claim 12, wherein the first metal element is selected from the group consisting of Li, Na, K, Be, Mg, B, and Al, and the second metal element is selected from the group consisting of Sc, Ti, V, Cr, Mn, Fe, Co, Ni, Cu, Zn, Y, Zr, Nb, Mo, Be, Mg, Ca, Sr, B, Al, Ge, Sn and Ga.

14. The cathode of claim 8, wherein said cathode material has a BET specific surface area ranging from 5 to 100 $m^2/g$.

15. The cathode of claim 8, wherein said cathode material further comprises an aqueous binder.

16. The cathode of claim 15, wherein said aqueous binder is styrene-butadiene rubber (SBR).

17. The cathode of claim 8, wherein said cathode material further includes a thickener.

18. The cathode of claim 17, wherein said thickener is carboxymethyl cellulose (CMC).

19. The cathode of claim 8, wherein said cathode material further comprises a non-aqueous binder.

20. The cathode of claim 19, wherein said non-aqueous binder is polyvinylidene fluoride (PVDF).

* * * * *